(12) United States Patent
Elofsson et al.

(10) Patent No.: US 12,459,858 B2
(45) Date of Patent: Nov. 4, 2025

(54) SOLAR CONTROL GLAZING AND METHOD OF ITS PRODUCTION

(71) Applicant: MIMSI Materials AB, Linköping (SE)

(72) Inventors: Viktor John Elofsson, Nykil (SE); Sankara Pillay, Linköping (SE); Rickard Tim Gunnarsson, Mantorp (SE); Konstantinos Sarakinos, Linköping (SE)

(73) Assignee: MIMSI Materials AB, Linkoping (SE)

( * ) Notice: Subject to any disclaimer, the term of this patent is extended or adjusted under 35 U.S.C. 154(b) by 465 days.

(21) Appl. No.: 17/920,273

(22) PCT Filed: Apr. 21, 2021

(86) PCT No.: PCT/EP2021/060324
§ 371 (c)(1),
(2) Date: Oct. 20, 2022

(87) PCT Pub. No.: WO2021/214107
PCT Pub. Date: Oct. 28, 2021

(65) Prior Publication Data
US 2023/0159382 A1      May 25, 2023

(30) Foreign Application Priority Data
Apr. 21, 2020    (SE) .................................... 2050461-9

(51) Int. Cl.
*C03C 17/36*    (2006.01)

(52) U.S. Cl.
CPC ........ *C03C 17/3647* (2013.01); *C03C 17/366* (2013.01); *C03C 17/3668* (2013.01);
(Continued)

(58) Field of Classification Search
None
See application file for complete search history.

(56) References Cited

U.S. PATENT DOCUMENTS

| 4,320,169 A | 3/1982 | Yatabe et al. |
| 6,030,671 A | 2/2000 | Yang et al. |
| (Continued) | | |

FOREIGN PATENT DOCUMENTS

| CN | 104979037 A | 10/2015 |
| CN | 107077906 A | 8/2017 |
| (Continued) | | |

OTHER PUBLICATIONS

DeSilva et al., "Optical properties and oxidation of α-phase Ag—Al thin films," Nanotechnology, vol. 28, No. 9, Jan. 2017, pp. 095202 (10 pp).

(Continued)

*Primary Examiner* — Xiaobei Wang
(74) *Attorney, Agent, or Firm* — Kagan Binder, PLLC (57) ABSTRACT

The present document discloses a glazing in the form of a window glass or vehicle glass which comprises a transparent substrate, and a coating. The coating comprises, in order outward from the transparent substrate, an optional diffusion barrier layer, a first anti-reflective layer, an optional first seed layer, a first functional metal layer, at least one optional first blocker layer, a second anti-reflective layer, an optional second seed layer, a second functional metal layer, at least one optional second blocker layer, a third anti-reflective layer, and an optional top layer, wherein at least one of the first functional metal layer and the second functional metal layer comprises a Ag alloy consisting essentially of Ag and Al.

18 Claims, 2 Drawing Sheets

(52) U.S. Cl.
CPC .... *C03C 17/3681* (2013.01); *C03C 2217/256* (2013.01); *C03C 2217/73* (2013.01)

(56) References Cited

U.S. PATENT DOCUMENTS

| | | |
|---|---|---|
| 7,005,189 B1 | 2/2006 | Tachibana et al. |
| 7,132,130 B1 | 11/2006 | Kloss |
| 2002/0034603 A1 | 3/2002 | Nee |
| 2003/0227250 A1 | 12/2003 | Nee |
| 2005/0170132 A1 | 8/2005 | Nee |
| 2006/0068227 A1 | 3/2006 | Ukishima et al. |
| 2006/0255727 A1 | 11/2006 | Nee |
| 2007/0131276 A1 | 6/2007 | Nee |
| 2007/0259191 A1 | 11/2007 | Simons et al. |
| 2011/0169399 A1 | 7/2011 | Ito et al. |
| 2013/0118673 A1 | 5/2013 | Frank et al. |
| 2014/0170413 A1 | 6/2014 | Hassan et al. |
| 2014/0170434 A1 | 6/2014 | Hassan et al. |
| 2015/0004383 A1 | 1/2015 | Sandre-Chardonnal |
| 2015/0093587 A1 | 4/2015 | Imamura et al. |
| 2016/0297708 A1 | 10/2016 | Brossard |
| 2017/0200526 A1 | 7/2017 | Guo et al. |
| 2017/0227694 A1 | 8/2017 | Nakanishi et al. |
| 2018/0096748 A1 | 4/2018 | Kim et al. |
| 2018/0244569 A1 | 8/2018 | Lu et al. |
| 2018/0251886 A1 | 9/2018 | Lu et al. |
| 2018/0297891 A1 | 10/2018 | Goodwin et al. |
| 2019/0105872 A1 | 4/2019 | Nakazawa et al. |
| 2019/0185374 A1 | 6/2019 | Kwon et al. |
| 2021/0395140 A1 | 12/2021 | Elofsson et al. |

FOREIGN PATENT DOCUMENTS

| | | | |
|---|---|---|---|
| DE | 4422830 A1 | 1/1995 | |
| DE | 102009051796 A1 | 5/2011 | |
| EP | 1043606 A1 | 10/2000 | |
| EP | 1371745 A1 | 12/2003 | |
| EP | 1889930 A1 | 2/2008 | |
| EP | 1155816 A1 | 11/2011 | |
| EP | 2804843 A1 | 11/2014 | |
| EP | 3068742 A1 | 9/2016 | |
| EP | 3435385 A1 | 1/2019 | |
| EP | 3870548 A1 | 9/2021 | |
| JP | H06-345491 A | 12/1994 | |
| JP | 2004002929 A | 1/2004 | |
| JP | 2009151963 A | 7/2009 | |
| KR | 20100057442 A | 5/2010 | |
| SE | 1851302 A1 | 4/2020 | |
| SE | 543408 C2 | 1/2021 | |
| WO | 97/08357 A1 | 3/1997 | |
| WO | 2009/067263 A1 | 5/2009 | |
| WO | 2013/107983 A1 | 7/2013 | |
| WO | 2015/071612 A1 | 5/2015 | |
| WO | 2018/091556 A1 | 5/2018 | |
| WO | WO-2019138370 A1 * | 7/2019 | ........... G06F 3/0443 |
| WO | 2020/083873 A1 | 4/2020 | |
| WO | 2021/214107 A1 | 10/2021 | |
| WO | 2021/214108 A1 | 10/2021 | |
| WO | 2021/214109 A1 | 10/2021 | |
| WO | 2021/214110 A1 | 10/2021 | |
| WO | 2021/214111 A1 | 10/2021 | |

OTHER PUBLICATIONS

Gu et al., "Ultrasmooth and Thermally Stable Silver-Based Thin Films with Subnanometer Roughness by Aluminum Doping," ASC Nano, vol. 8, No. 10, Sep. 2014, pp. 10343-10351.
International Search Report and Written Opinion of International Application No. PCT/EP2021/060324, mailed Jul. 16, 2021, 14 pp.
International Preliminary Report on Patentability from International Application No. PCT/EP2021/060324, mailed Nov. 3, 2022, 8 pp.
International Search Report and Written Opinion of International Application No. PCT/EP2021/060326, mailed Jul. 19, 2021, 12 pp.
International Preliminary Report on Patentability from International Application No. PCT/EP2021/060326, mailed Nov. 3, 2022, 7 pp.
International Search Report and Written Opinion of International Application No. PCT/EP2021/060327, mailed Jul. 14, 2021, 13 pp.
International Preliminary Report on Patentability from International Application No. PCT/EP2021/060327, mailed Nov. 3, 2022, 7 pp.
International Search Report and Written Opinion of International Application No. PCT/EP2021/060329, mailed Jul. 8, 2021, 14 pp.
International Preliminary Report on Patentability from International Application No. PCT/EP2021/060329, mailed Nov. 3, 2022, 8 pp.
International Search Report and Written Opinion of International Application No. PCT/EP2021/060332, mailed Sep. 21, 2021, 19 pp.
International Preliminary Report on Patentability from International Application No. PCT/EP2021/060332, mailed Nov. 3, 2022, 11 pp.
Kim et al., "Improvement of the thermal stability of silver metallization," Journal of Applied Physics, vol. 94, No. 8, Sep. 2003, pp. 5393-5395.
Loka et al., "Thermally Stable and high Reflectivity Al-doped silver thin films deposited by magnetron sputtering," Materials Research Express, vol. 5, No. 3, Mar. 2018, pp. 034002 (7 pp).
Sugawara et al., "Comparison of the agglomeration behavior of Ag(Al) films and Ag(Au) films," Microelectronic Engineering, vol. 84, No. 11, Jun. 2007, pp. 2476-2480.
Sugimoto et al., "Effect of Al doping in the Ag layer of MgZnO/Ag/MgZnO dielectric/metal/dielectric UV-visible transparent conductive films," Physica Status Solidi C, vol. 13, No. 7-9, Mar. 2016, pp. 568-571.
Sugimoto et al., "Thermal durability of AZO/Ag(Al)/AZO transparent conductive films," Japanese Journal of Applied Physics, vol. 55, No. 4S, Mar. 2016, pp. 04EJ15 (6 pp).
Zhang et al., "An Ultrathin, Smooth, and Low-Loss Al-Doped Ag Film and Its Application as a Transparent Electrode in Organic Photovoltaics," Advanced Materials, vol. 26, No. 32, Jun. 2014, pp. 5696-5701.

* cited by examiner

SOLAR CONTROL GLAZING AND METHOD OF ITS PRODUCTION

CROSS-REFERENCE TO RELATED APPLICATIONS

This application claims priority to International Application No. PCT/EP2021/060324, filed Apr. 21, 2021 and titled "SOLAR CONTROL GLAZING AND METHOD OF ITS PRODUCTION," which in turn claims priority from a Swedish Patent Application having serial number 2050461-9, filed Apr. 21, 2020, both of which are incorporated herein by reference in their entireties.

TECHNICAL FIELD

The present disclosure relates to a glazing for use as window glass or vehicle glass and a method of producing a glazing.

BACKGROUND

Glazings with a high visible transmittance and high infrared (IR) reflectance are desirable in many applications, allowing light in the visible portion of the electromagnetic spectrum to pass through the glazing while reflecting IR radiation to reduce heat transfer through the glazing.

Common types of glazings that are used in architectural applications include clear and tinted float glass, tempered glass, laminated glass as well as a variety of coated glasses, all of which can be glazed singly or as double, or even triple, glazing units.

It is known to provide solar control coatings on window glass in order to reduce the amount of solar radiation from the near-IR part of the electromagnetic spectrum that is transferred through the glass from outside the building, while still allowing visible light to pass through. The most efficient type of coating comprises at least two functional metal layers, which typically consist of silver (Ag) owing to its high IR reflectivity characteristics.

The functional metal layers are deposited in between anti-reflective layers which each typically include at least one dielectric layer for tuning the optical properties of the glazing. These anti-reflective layers also ensure protection of the functional metal layers from chemical attack and/or mechanical stress.

The optical and electrical properties of the glazing are directly related to the material used as a functional metal layer and the quality of the functional metal layer in terms of, e.g., crystallinity, grain size and interfacial roughness.

WO 2009/067263 is related to a solar control coating with low solar heat gain coefficient for use as, e.g., a window coating, comprising a transparent substrate coated with a stack of layers comprising two functional metal layers of Ag.

A particular challenge is to increase reflectance and decrease transmittance in the solar spectrum, such as 300-2500 nm, while maintaining high transmittance of light in the visible spectrum, such as 380-780 nm.

SUMMARY

It is an object of the present disclosure to provide a glazing in the form of a window glass or vehicle glass.

Further objects are to provide a method of producing a glazing and a use of a sputtering target for applying a surface coating.

The invention is defined by the appended independent claims. Embodiments are set forth in the dependent claims, in the following description and in the drawings.

According to a first aspect there is provided a glazing in the form of a window glass or vehicle glass. The glazing comprises a transparent substrate and a coating. The coating comprises in order outward from the transparent substrate: optionally, a diffusion barrier layer, a first anti-reflective layer, optionally, a first seed layer, a first functional metal layer, optionally, at least one first blocker layer, a second anti-reflective layer, optionally, a second seed layer, a second functional metal layer, optionally, at least one second blocker layer, a third anti-reflective layer, optionally, a top layer. Each anti-reflective layer has at least one dielectric layer. At least one of the first functional metal layer and the second functional metal layer comprises a Ag alloy consisting essentially of Ag and Al.

By "glazing" is herein meant a transparent substrate coated with a stack of thin film materials or layers.

The glazing can be used as a glass component of a building's facade or internal surfaces (such as the glass panes in an insulated glass unit), and is also used to refer to the glass used in transport and utility vehicles (such as windshields and panoramic roofs).

The glazing may be transparent. By transparent is herein meant a glazing having visible light transmittance typically of the order of 30-90%.

The glazing may be a sheet. Such a sheet may be planar, single curved or double curved.

By window glass is herein meant a window glass for a building. It may also be a roof glass, glass façade or a door glass.

By vehicle glass is meant a glass for a vehicle, for example a rear glass, side glass, sun roof, windshield or a windscreen (front window) in a car.

By transparent substrate is here meant a substrate having visible light transmittance typically of the order of 30-95%.

The transparent substrate may be substantially planar.

By "consists essentially of" is herein meant that the layer consists essentially of, or consists of, Ag, or Ag and Al. The Ag alloy coating layer contains substantially only elemental Ag, or Ag and Al, but may contain insubstantial or incidental amounts of impurities ordinarily associated with Ag and Al, and may also contain incidental insubstantial or substantial amounts of materials that do not materially affect the basic and novel characteristics of the Ag, or Ag alloy layer.

As a non-limiting example, the Ag alloy coating layer may contain less than 0.1 wt. %, preferably less than 0.05 wt. %, most preferably less than 0.01 wt. % of other components, such as incidental impurities.

The Al content is herein calculated as a ratio of Al to the sum of the amounts of the Ag and Al. This means that possible incidental impurities are not included in the Al content.

The layers of the coating may, but need not, form a continuous layer onto the layer it is deposited upon or transparent substrate.

The optical properties and the electrical properties of the glazing are directly related to the material used as functional metal layer and the quality of the functional metal layer in terms of, e.g., crystallinity, grain size and interfacial roughness.

Experimental data discussed in the following description show that the coating of the glazing has improved characteristics in terms of lower solar direct transmittance and higher solar direct reflectance, as determined according to the European standard EN410, for the same light transmittance, as determined according to the European standard EN410, as compared to a coating comprising unalloyed Ag functional metal layers.

The Al content of the Ag alloy may be 0.05-0.20 at. %, preferably 0.08-0.14 at. %, more preferably 0.10-0.12 at. %, the rest being Ag.

The first functional metal layer may comprise the Ag alloy, and the second functional metal layer may consist essentially of Ag.

The first functional metal layer may consist essentially of Ag, and the second functional metal layer may comprise the Ag alloy.

The first functional metal layer may comprise the Ag alloy, and the second functional metal layer may comprise a second Ag alloy consisting essentially of Ag and Al.

The Al content of the second Ag alloy may be 0.05-0.20 at. %, preferably 0.08-0.14 at. %, more preferably 0.10-0.12 at. %, the rest being Ag.

The Al content of the second functional metal layer may be the same as the Al content of the first functional metal layer.

The Al content of the second functional metal layer may be greater than an Al content of the first functional metal layer.

The Al content of the second functional metal layer may be lower than an Al content of the first functional metal layer.

The coating may further comprise, in order outward from the transparent substrate, continuing from the third anti-reflective layer, and inwardly of the top layer, if any: optionally, a third seed layer, a third functional metal layer, optionally, at least one third blocker layer, and a fourth anti-reflective layer, wherein the fourth anti-reflective layer may have at least one dielectric layer.

The third functional metal layer may comprise a third Ag alloy consisting essentially of Ag and Al.

An Al content of the third Ag alloy may be 0.05-0.20 at. %, preferably 0.08-0.14 at. %, more preferably 0.10-0.12 at. %, the rest being Ag.

The third functional metal layer may consist essentially of Ag.

The coating may further comprise, in order outward from the transparent substrate, continuing from the fourth anti-reflective layer, and inwardly of the top layer, if any: optionally, a fourth seed layer, a fourth functional metal layer, optionally, at least one fourth blocker layer, and a fifth anti-reflective layer, wherein the fifth anti-reflective layer may have at least one dielectric layer.

The fourth functional metal layer may comprise a fourth Ag alloy consisting essentially of Ag and Al.

An Al content of the fourth Ag alloy may be 0.05-0.20 at. %, preferably 0.08-0.14 at. %, more preferably 0.10-0.12 at. %, the rest being Ag.

The fourth functional metal layer may consist essentially of Ag.

The thickness of at least one of the first functional metal layer, the second functional metal layer, the third functional metal layer and the fourth functional metal layer may be 5-20 nm, preferably 6-12 nm, more preferably 8-10 nm.

The glazing may have a light transmittance of at least 20%, preferably at least 30% or at least 40% as determined according to the European standard EN 410.

According to a second aspect, there is provided a method of producing a glazing in the form of a window glass or vehicle glass. The method comprises providing a transparent substrate, applying, by Physical Vapor Deposition, in order outward from the transparent substrate: optionally, a diffusion barrier layer, a first anti-reflective layer, optionally, a first seed layer, a first functional metal layer, optionally, at least one first blocker layer, a second anti-reflective layer, optionally, a second seed layer, a second functional metal layer, optionally, at least one second blocker layer, a third anti-reflective layer, optionally, a top layer, to the transparent substrate, such that each anti-reflective layer has at least one dielectric layer, and such that at least one of the first functional metal layer and the second functional metal layer comprises a Ag alloy consisting essentially of Ag and Al.

An Al content of the Ag alloy may be 0.05-0.20 at. %, preferably 0.08-0.14 at. %, more preferably 0.10-0.12 at. % of the of the Ag alloy, the rest being Ag.

The first functional metal layer may comprise the Ag alloy, and the second functional metal layer may consist essentially of Ag.

The first functional metal layer may consist essentially of Ag, and the second functional metal layer may comprise the Ag alloy.

The first functional metal layer may comprise the Ag alloy, and the second functional metal layer may comprise a second Ag alloy consisting essentially of Ag and Al.

An Al content of the second Ag alloy is 0.05-0.20 at. %, preferably 0.08-0.14 at. %, more preferably 0.10-0.12 at. %, the rest being Ag.

The Al content of the second functional metal layer may be the same as the Al content of the first functional metal layer.

The Al content of the second functional metal layer may be greater than an Al content of the first functional metal layer.

The Al content of the second functional metal layer may be lower than an Al content of the first functional metal layer.

The method may further comprise applying, by Physical Vapor Deposition, in order outward from the transparent substrate, continuing from the third anti-reflective layer, and inwardly of the top layer, if any: optionally, a third seed layer, a third functional metal layer, optionally, at least one third blocker layer, and a fourth anti-reflective layer, wherein the fourth anti-reflective layer may have at least one dielectric layer.

The third functional metal layer may comprise a third Ag alloy consisting essentially of Ag and Al.

An Al content of the third Ag alloy may be 0.05-0.20 at. %, preferably 0.08-0.14 at. %, more preferably 0.10-0.12 at. %, the rest being Ag.

The third functional metal layer may consist essentially of Ag.

The method may further comprise applying, by Physical Vapor Deposition, in order outward from the transparent substrate, continuing from the fourth anti-reflective layer, and inwardly of the top layer, if any: optionally, a fourth seed layer, a fourth functional metal layer, optionally, at least one fourth blocker layer, and a fifth anti-reflective layer, wherein the fifth anti-reflective layer may have at least one dielectric layer.

The fourth functional metal layer may comprise a fourth Ag alloy consisting essentially of Ag and Al.

An Al content of the fourth Ag alloy may be 0.05-0.20 at. %, preferably 0.08-0.14 at. %, more preferably 0.10-0.12 at. %, the rest being Ag.

The fourth functional metal layer may consist essentially of Ag.

The thickness of at least one of the first functional metal layer, the second functional metal layer, the third functional metal layer and the fourth functional metal layer may be provided to 5-20 nm, preferably 6-12 nm, more preferably 8-10 nm.

At least one of the first functional metal layer, the second functional metal layer, the third functional metal layer and the fourth functional metal layer may be deposited from a Ag alloy sputtering target.

According to a third aspect, there is provided a use of a sputtering target, comprising a homogeneous body of Ag alloy target material, wherein the Ag alloy target material consists essentially of Ag and Al for applying a surface coating on a transparent substrate to form a window glass or vehicle glass.

Further, an Al content of the Ag alloy target material may be 0.05-0.20 at. %, preferably 0.08-0.14 at. %, more preferably 0.10-0.12 at. % of the Ag alloy target material, the rest being Ag.

DETAILED DESCRIPTION

The concept disclosed herein will now be explained in more detail. Initially, the structure of a glazing is described, thereafter the method of producing such a glazing is described. Finally, characterization results of the glazing are discussed.

Figure 1:
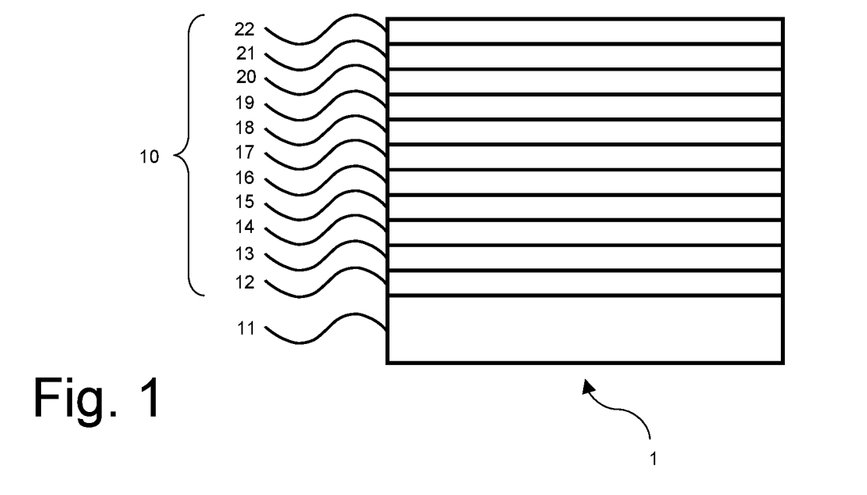
FIG. 1 schematically illustrates an example of a glazing structure consisting of two functional metal layers.

In FIG. 1 a non-limiting example of a structure of a glazing 1 is schematically illustrated. The glazing 1 comprises a transparent substrate 11 and a coating 10 comprising multiple layers of thin film materials. Starting from the transparent substrate 11 and with increasing distance from the transparent substrate 11, the coating 10 comprises an optional diffusion barrier layer 12, a first anti-reflective layer 13, a first optional seed layer 14, a first functional metal layer 15, at least one first optional blocker layer 16, a second anti-reflective layer 17, a second optional seed layer 18, a second functional metal layer 19, at least one second optional blocker layer 20, a third anti-reflective layer 21, and an optional top layer 22.

The transparent substrate 11 may be a glass substrate, such as a soda-lime glass substrate, or a substrate of organic polymers. The substrate may be homogeneous or laminated, comprising one or more glass layers and, e.g., one or more polymer films. Preferably, an outwardly exposed surface, on which the coating is deposited, is made of glass.

The dimension of the transparent substrate 11 may range from over-sized glass panes, which, e.g., may be 3300×6000 mm or 3210×15000 mm or larger, down to small structures, e.g., 200×200 mm. The described glazing is, however, not limited to any specific size of the substrate.

The thickness of the transparent substrate may be about 0.3 mm to 25 mm, or about 2 mm to 8 mm or 4 mm to 6 mm. The described coating is, however, not limited to any thickness of the transparent substrate 11.

An optional diffusion barrier layer 12 may be formed on the transparent substrate 11. The optional diffusion barrier 12 layer may be situated in between the transparent substrate 11 and the first anti-reflective layer 13. The diffusion barrier layer may be a layer consisting essentially of aluminum oxide, silicon nitride or zinc stannate.

The diffusion barrier layer 12 may act as a barrier layer and the purpose of the diffusion barrier layer is to prevent sodium ions from diffusing from the glass into the other layers, such as the functional metal layers, of the coating 10. Diffusion into the first functional metal layer 15 and/or the second functional metal layer 19 may have detrimental effects on said layers.

The first anti-reflective layer 13 may be formed either directly on the transparent substrate 11 or on the optional diffusion barrier layer 12.

The first anti-reflective layer 13 may comprise at least one dielectric layer of a metal oxide, such as tin oxide, zinc oxide, zinc tin oxide, titanium oxide, silicon oxide, niobium oxide or zirconium oxide, or a metal nitride, such as silicon nitride or titanium nitride.

The purpose of the first anti-reflective layer 13 is to tune the optical properties of the glazing 1 by tailoring the thickness of the at least one dielectric layer. The first anti-reflective layer 13 may also protect the first functional metal layer 15 and/or the second functional metal layer 19 from chemical attack and/or mechanical stress.

The thickness of the first anti-reflective layer 13 may be about 5 to 120 nm, or about 10 to 100 nm, or about 15 nm to 90 nm.

On the first anti-reflective layer 13, an optional first seed layer 14 may be formed. The optional first seed 14 layer may be situated in between the first anti-reflective layer 13 and the first functional metal layer 15. The optional first seed layer 14 may be a layer of zinc oxide or zinc oxide doped by an additional element, such as aluminum.

The purpose of the first seed layer 14 is to improve the quality of the first functional metal layer 15. For example, it may impose an epitaxial relationship for the first functional metal layer 15 so that the crystallites in the first functional metal layer 15 favour to grow with a (111) out-of-plane oriented texture and in that way increases electrical conductivity of the first functional metal layer 15. The first seed layer 14 may also confer mechanical support to the first functional metal layer 15.

The thickness of the first seed layer 14 may be about 2 to 25 nm, or about 3 to 15 nm.

The first functional metal layer 15 may be formed onto the first seed layer 14 or directly on the first anti-reflective layer 13.

The first functional metal layer 15 is Ag, or a Ag alloy. The first functional metal layer may have high IR reflectivity characteristics.

The thickness of the first functional metal layer 15 may be about 5 to 20 nm, or about 6 to 12 nm, or about 8 nm to 10 nm.

The glazing 1 may further comprise at least one first optional blocker layer 16 formed on top of the first functional metal layer 15. The at least one first optional blocker layer 16 may be situated in between the first functional metal layer 15 and the second anti-reflective layer 17.

The at least one first blocker layer 16 may be an oxidized metal layer, based on nickel chrome, nickel, chrome, niobium, titanium or zinc, or a metal nitride layer, based on nickel chrome or chrome.

The purpose of the at least one first optional blocker layer 16 is to improve the quality of the first functional metal layer 15 by protecting the first functional metal layer during deposition of a subsequent layer, such as the second anti-reflective layer 17. The at least one first optional blocker layer can also act as an absorbing layer to decrease light transmittance without increasing light reflectance.

The thickness of the at least one first optional blocker layer 16 may be about 0.5 to 6 nm, or about 1 to 4 nm.

The second anti-reflective layer 17 may then be formed on the at least one first optional blocker layer 16 or directly on the first functional metal layer 15.

The second anti-reflective layer 17 may comprise at least one dielectric layer of a metal oxide, such as tin oxide, zinc oxide, zinc tin oxide, titanium oxide, silicon oxide, niobium oxide or zirconium oxide, or a metal nitride, such as silicon nitride or titanium nitride.

The purpose of the second anti-reflective layer 17 is to tune the optical properties of the glazing 1 by tailoring the thickness of the at least one dielectric layer.

The second anti-reflective layer 17 may also protect the first functional metal layer 15 and/or the second functional metal layer 19 from chemical attack and/or mechanical stress.

The thickness of the second anti-reflective layer 17 may be about 5 to 120 nm, or about 10 to 100 nm, or about 15 nm to 90 nm.

On top of the second anti-reflective layer 17, a second optional seed layer 18 may be formed. The second optional seed layer 18 may be situated in between the second anti-reflective layer 17 and the second functional metal layer 19. The second optional seed layer 18 may be a layer of zinc oxide or zinc oxide doped by an additional element, such as aluminum.

The purpose of the second optional seed layer 18 is to improve the quality of the second functional metal layer 19. For example, it may impose an epitaxial relationship for the second functional metal layer 19 so that the crystallites in the second functional metal layer 19 favour to grow with a (111) out-of-plane oriented texture and in that way increases electrical conductivity of the second functional metal layer 19. The second seed layer 18 may also confer mechanical support to the second functional metal layer 19.

The thickness of the second optional seed layer 18 may be about 2 to 25 nm, or about 3 to 15 nm.

The second functional metal layer 19 may be formed onto the second seed layer 18 or directly on the second anti-reflective layer 17.

The second functional metal layer 19 is Ag, or a Ag alloy. The second functional metal layer may have high IR reflectivity characteristics.

The thickness of the second functional metal layer 19 may be about 5 to 20 nm, or about 6 to 12 nm, or about 8 nm to 10 nm.

The glazing 1 may further comprise at least one second optional blocker layer 20 formed on top of the second functional metal layer 19. The at least one second optional blocker layer 20 may be situated in between the second functional metal layer 19 and the third anti-reflective layer 21.

The at least one second optional blocker layer 20 may be an oxidized metal layer, based on nickel chrome, nickel, chrome, niobium, titanium or zinc, or a metal nitride layer, based on nickel chrome or chrome.

The purpose of the at least one second optional blocker layer 20 is to improve the quality of the second functional metal layer 19 by protecting the second functional metal layer during deposition of a subsequent layer, such as the third anti-reflective layer 21. The at least one second blocker layer can also act as an absorbing layer to decrease light transmittance without increasing light reflectance.

The thickness of the at least one second optional blocker layer 20 may be about 0.5 to 6 nm, or about 1 to 4 nm.

The third anti-reflective layer 21 may then be formed on the at least one second blocker layer 20 or directly on the second functional metal layer 19.

The third anti-reflective layer 21 may comprise at least one dielectric layer of a metal oxide, such as tin oxide, zinc oxide, zinc tin oxide, titanium oxide, silicon oxide, niobium oxide or zirconium oxide, or a metal nitride, such as silicon nitride or titanium nitride.

The purpose of the third anti-reflective layer 21 is to tune the optical properties of the glazing 1 by tailoring the thickness of the at least one dielectric layer.

The third anti-reflective layer 21 may also protect the first functional metal layer 15 and/or the second functional metal layer 19 from chemical attack and/or mechanical stress.

The thickness of the third anti-reflective layer 21 may be about 5 to 120 nm, or about 10 to 100 nm, or about 15 nm to 90 nm.

An optional top layer 22 may be formed on the third anti-reflective layer 21. The top layer may be covering and in direct contact with the anti-reflective layer that is furthest away from the transparent substrate, wherein the top layer is further away from the transparent substrate as compared to the anti-reflective layer it is covering.

The top layer 22 may comprise a nitride, e.g., silicon nitride, or an oxide, e.g., aluminum oxide or titanium oxide.

The purpose of the top layer 22 is to protect the underlying layers from mechanical damage, e.g., scratches, and chemical attacks.

The purpose of the first functional metal layer 15 and the second functional metal layer 19 is to reduce the amount of solar radiation from the near-IR part of the electromagnetic spectrum that is transferred through the glass from outside the building, while still being transparent in the visible spectrum.

Figure 4:
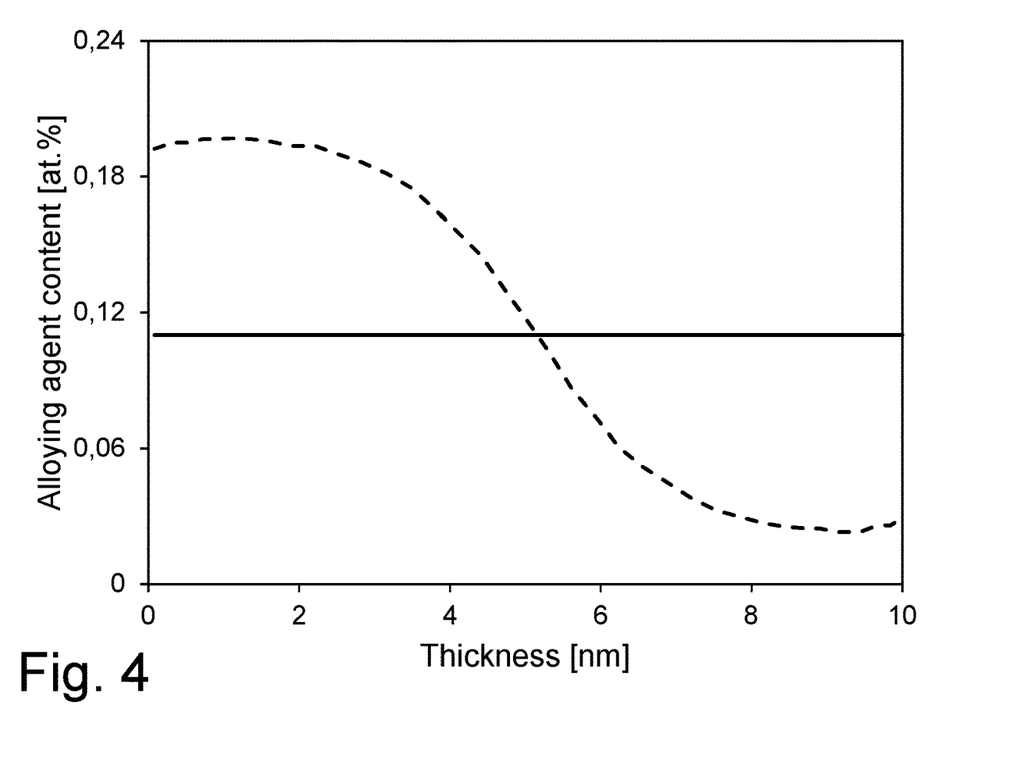
FIG. 4 illustrates functional metal Ag alloy layers wherein the alloying agent content is homogeneously and inhomogeneously distributed.

At least one of the first functional metal layer 15 and the second functional metal layer 19 is a Ag alloy. The Ag alloy is Ag alloyed with Al. The alloying agent content of the Ag alloy may be homogeneously distributed, or the alloying agent content of the Ag alloy may be inhomogeneously distributed. A non-limiting example of the homogeneously and inhomogeneously distributed alloying agent contents is schematically illustrated in FIG. 4, wherein the functional metal Ag alloy layer thickness measured in the direction outward from the transparent substrate in nanometers is represented on the horizontal axis, wherein the alloying agent content in at. % is represented on the vertical axis, wherein a homogeneously distributed alloy is represented by the solid line and wherein an inhomogeneously distributed alloy is represented by the dashed curve.

The inhomogeneously distributed alloying agent content may be divided into three zones. In the direction outward from the transparent substrate, the three zones may be a first composition layer zone, a gradient composition layer zone, and a second composition layer zone that are covering and in direct contact with each other. The first composition layer zone and the second composition layer zone each consist of a majority of Ag or Ag alloy. The alloying agent content of the first composition layer zone may be higher than the alloying agent content of the second composition layer zone, or the alloying agent content of the first composition layer zone may be lower than the alloying agent content of the second composition layer zone. The gradient composition layer zone may have an alloying agent content that is substantially the same as the first composition layer zone where the first composition layer zone and the gradient composition layer zone are in direct contact with each other. The gradient composition layer zone may have an alloying agent content that is substantially the same as the second composition layer zone where the second composition layer zone and the gradient composition layer zone are in direct contact with each other. The alloying agent content within the gradient composition layer zone may be transient.

The first functional metal layer 15 may be the Ag alloy and the second function metal layer 19 may be Ag, or the first functional metal layer 15 may be Ag and the second function metal layer 19 may be the Ag alloy, or the first functional metal layer 15 may be the Ag alloy and the second function metal layer 19 may be a second Ag alloy.

The first Ag alloy may have an Al content that is higher, the same, or lower than the Al content of the second Ag alloy. Preferably the first Ag alloy and the second Ag alloy have the same Al content.

The coating 10 may be used as a so-called solar control coating. The emissivity of such a coating is typically ≤0.10, preferably ≤0.07.

The main purpose of a solar control coating is to reduce the amount of solar radiation (such as 300-2500 nm) that is transferred through the glazing such that the interior of, e.g., a building or a vehicle is less heated by the sun, while still allowing visible light (such as 380-780 nm) to pass through the glazing.

The glazing 1 may present a solar direct transmittance, as determined according to the European standard EN 410, which is lower than a solar direct transmittance of a glazing having a coating with the same layer structure and layer thicknesses as the coating comprising at least one Ag alloy functional metal layer, but wherein each Ag alloy functional metal layer is replaced by an unalloyed Ag functional metal layer.

In particular, the glazing 1 may present a solar direct transmittance, as determined according to the European standard EN 410, which is at least 1%, preferably at least 2% lower than a solar direct transmittance of a glazing having a coating with the same layer structure and layer thicknesses as the coating comprising at least one Ag alloy functional metal layer, but wherein each Ag alloy functional metal layer is replaced by an unalloyed Ag functional metal layer.

The glazing 1 may present a solar direct reflectance, as determined according to the European standard EN 410, which is higher than a solar direct reflectance of a glazing having a coating with the same layer structure and layer thicknesses as the coating comprising at least one Ag alloy functional metal layer, but wherein each Ag alloy functional metal layer is replaced by an unalloyed Ag functional metal layer.

In particular, the glazing 1 may present a solar direct reflectance, as determined according to the European standard EN 410, which is at least 1%, preferably at least 2% higher than a solar direct reflectance of a glazing having a coating with the same layer structure and layer thicknesses as the coating comprising at least one Ag alloy functional metal layer, but wherein each Ag alloy functional metal layer is replaced by an unalloyed Ag functional metal layer.

For a solar control coating, two, three or four of the functional metal layers may be combined in a coating to form a glazing. Excluding the optional layers, the layer structure of a glazing comprising three functional metal layers may be glass/first anti-reflective layer/first functional metal layer/second anti-reflective layer/second functional metal layer/third anti-reflective layer/third functional metal layer/fourth anti-reflective layer. A non-limiting example of such a structure including the optional layers can be seen in FIG. 2.

Figure 2:
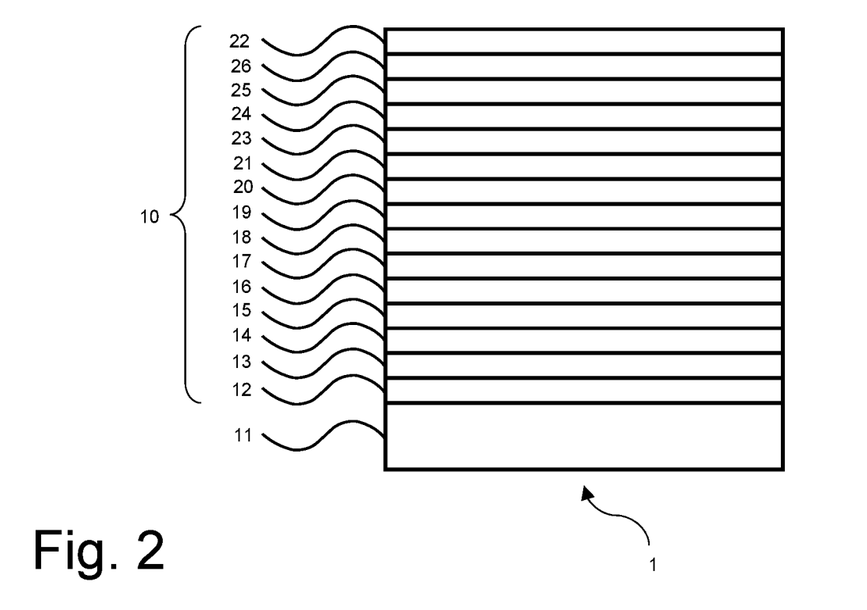
FIG. 2 schematically illustrates an example of a glazing structure consisting of three functional metal layers.

The structure illustrated in FIG. 2 comprises, in addition to the layers of the structure illustrated in FIG. 1, a third seed layer 23, which is optional, a third functional metal layer 24, at least one third blocker layer 25, which is optional and a fourth anti-reflective layer, all of which are provided outside the third anti-reflective layer 21 and inwardly of the top layer 22, if any.

Excluding the optional layers, the layer structure of a glazing comprising four functional metal layers may be glass/first anti-reflective layer/first functional metal layer/second anti-reflective layer/second functional metal layer/third anti-reflective layer/third functional metal layer/fourth anti-reflective layer/fourth functional metal layer/fifth anti-reflective layer. A non-limiting example of such a structure including the optional layers can be seen in FIG. 3.

Figure 3:
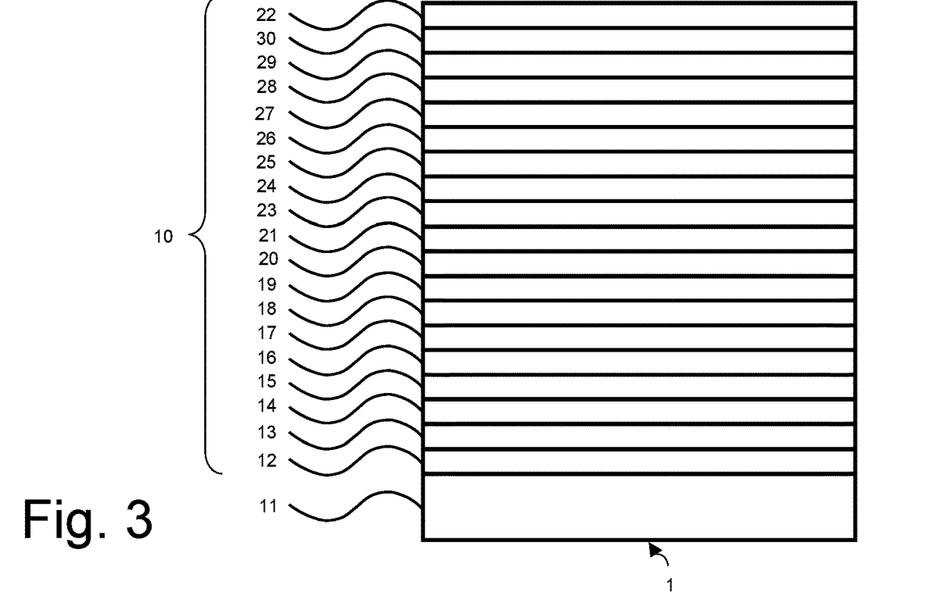
FIG. 3 schematically illustrates an example of a glazing structure consisting of four functional metal layers.

The structure illustrated in FIG. 3 comprises, in addition to the layers of the structure illustrated in FIG. 2, a fourth seed layer 27, which is optional, a third functional metal layer 28, at least one third blocker layer 29, which is optional and a fourth anti-reflective layer 29, all of which are provided outside the fourth anti-reflective layer 26 and inwardly of the top layer 22, if any. Thicknesses and compositions of any of the additional layers illustrated in FIGS. 2 and 3 may be the same as corresponding layers in the structure illustrated in FIG. 1.

Alternatively, thicknesses and/or compositions of the additional layers in FIGS. 2 and 3 may differ from the corresponding layers in the structure illustrated in FIG. 1.

Method for Production of the Glazing

Each of the layers of the coating 10 in FIG. 1 is formed by Physical Vapor Deposition (PVD), such as magnetron sputtering, evaporation, arc evaporation, pulsed laser deposition and combinations thereof. Preferably, the layers are deposited by magnetron sputtering.

The layers of the coating 10 may be deposited one layer at a time.

The different layers may be deposited in the same or in different sputter zones. The sputter zones may be spatially separated.

Alternatively, the sputter zones may be completely or partially overlapping sputtering zones.

The sputter zones may be stationary and the transparent substrate may be moveable. The transparent substrate may be passed through a sputter zone or between successive sputter zones by means of translation, and/or rotation of the substrate in relation to the sputter zones.

Alternatively, the substrate may be stationary and the sputter zones may surround and face, or at least partially face, the stationary substrate.

The dimensions of the sputtering zones may depend on the application and on the size of the substrate to be coated.

The deposition sources may be so-called sputtering targets.

There may be different deposition sources used for each deposited layer. Alternatively, the same deposition source may be used for deposition of a number of different layers.

The functional metal layer may be deposited from one single deposition source, such as an alloy sputtering target. Alternatively, the functional metal layer is deposited from two separate deposition sources. For example, for the Ag alloy, there may be one deposition source providing the Ag and one deposition source providing the Al. If the functional metal layer is deposited from separate deposition sources, the deposition of Ag and Al may take place simultaneously.

Each of the deposited layers may, but need not, form a continuous layer onto the previous layer or onto the substrate.

As an example, for deposition of the functional metal layer, the PVD system in which the deposition of layers take place may have a base pressure of about $10^{-2}$ Pa or below. A typical pressure in the PVD system when using a sputtering gas, such as Ar, is typically in the range of 0.1 to 2 Pa.

Typically, the substrate is not intentionally heated during deposition of the layers of the coating.

Characterization Results of the Glazing

Table 1 lists the light transmittance, solar direct transmittance and solar direct reflectance for glazings comprising a coating with multiple thin layers, two of which are functional metal layers. The Al content of the two functional metal layers is also listed in Table 1 where a content of 0 at. % represents an unalloyed Ag functional metal layer. As can be seen, the coating containing two Ag alloy functional metal layers, both with an Al content of 0.11 at. %, exhibits a lower solar direct transmittance and higher solar direct reflectance for the same light transmittance as compared to the coating containing two unalloyed Ag functional metal layers.

TABLE 1

Light transmittance, solar direct transmittance and solar direct reflectance as determined according to EN 410 for coatings containing two functional metal layers with different Al content.

| First functional metal layer Al content (at. %) | Second functional metal layer Al content (at. %) | Light transmittance according to EN 410 (%) | Solar direct transmittance according to EN 410 (%) | Solar direct reflectance according to EN 410 (%) |
|---|---|---|---|---|
| 0 | 0 | 82.6 | 49.1 | 35.3 |
| 0.11 | 0.11 | 82.6 | 48.5 | 36.4 |

Experimental Details

Coatings, comprising two functional metal layers, were deposited by means of magnetron sputtering on 50×50 mm² soda lime glass substrates in a coating chamber. The following coating layer structure was used in all experiments: 4 mm glass/16 nm TiOx/5 nm ZnOx:Al/8 nm Ag or Ag alloy/3 nm ZnOx:Al/75 nm ZnOx:Al/11.0 nm Ag or 11.3 nm Ag alloy/3 nm ZnOx:Al/30 nm ZnOx:Al. The thicknesses of the second functional metal layer comprising Ag or Ag alloy were varied in order to achieve the same light transmittance. The Al dopant content of the ZnOx:Al target employed was 2 wt. % Al. All dielectric layers, except for the ZnOx:Al blocker layers deposited directly after the Ag or Ag alloy layers, were deposited in a combined argon and oxygen environment. The Ag and Ag alloy layers and the ZnOx:Al blocker layers deposited directly after the Ag or Ag alloy layers were deposited using argon as the sputtering or working gas. The Al content of functional metal layers comprising a Ag alloy was 0.11 at. %.

The electrical properties of the coatings were measured using a 4-point probe to determine the sheet resistance. The optical properties in terms of transmittance and reflectance of the glazing were measured with an UV/VIS/NIR spectrophotometer in the wavelength range 300-2500 nm.

The alloying agent content of the functional metal layer was determined using X-ray fluorescence measurements of about 300 nm thick functional metal layers deposited directly on silicon substrates without the deposition of any other layers.

The invention claimed is:

1. A glazing in the form of a window glass or vehicle glass, comprising:
   a transparent substrate, and
   a coating, comprising, in order outward from the transparent substrate;
   optionally, a diffusion barrier layer,
   a first anti-reflective layer,
   optionally, a first seed layer,
   a first functional metal layer,
   optionally, at least one first blocker layer,
   a second anti-reflective layer,
   optionally, a second seed layer,
   a second functional metal layer,
   optionally, at least one second blocker layer,
   a third anti-reflective layer,
   optionally, a top layer,
   wherein each anti-reflective layer has at least one dielectric layer,
   wherein at least one of the first functional metal layer and the second functional metal layer comprises a Ag alloy consisting essentially of Ag and Al, and
   wherein an Al content of the Ag alloy is 0.05-0.14 at %, the rest being Ag.

2. The glazing as claimed in claim 1, wherein the first functional metal comprises the Ag alloy, and
   wherein the second functional metal layer consists essentially of Ag.

3. The glazing as claimed in claim 1, wherein the first functional metal layer consists essentially of Ag, and
   wherein the second functional metal layer comprises the Ag alloy.

4. The glazing as claimed in claim 1, wherein the first functional metal layer comprises the Ag alloy, and
   wherein the second functional metal layer comprises a second Ag alloy consisting essentially of Ag and Al.

5. The glazing as claimed in claim 4, wherein an Al content of the second Ag alloy is 0.05-0.20 at %, the rest being Ag.

6. The glazing as claimed in claim 4, wherein the Al content of the second functional metal layer is the same as the Al content of the first functional metal layer.

7. The glazing as claimed in claim 4, wherein the Al content of the second functional metal layer is greater than an Al content of the first functional metal layer.

8. The glazing as claimed in claim 4, wherein the Al content of the second functional metal layer is lower than an Al content of the first functional metal layer.

9. The glazing as claimed in claim 1, where the coating further comprises, in order outward from the transparent substrate, continuing from the third anti-reflective layer, and inwardly of the top layer, if any:
   optionally, a third seed layer,
   a third functional metal layer,
   optionally, at least one third blocker layer, and
   a fourth anti-reflective layer,
   wherein the fourth anti-reflective layer has at least one dielectric layer.

10. The glazing as claimed in claim 9, wherein the third functional metal layer comprises a third Ag alloy consisting essentially of Ag and Al.

11. The glazing as claimed in claim 10, wherein an Al content of the third Ag alloy is 0.05-0.20 at %, the rest being Ag.

12. The glazing as claimed in claim 9, wherein the third functional metal layer consists essentially of Ag.

13. The glazing as claimed in claim 9, where the coating further comprises, in order outward from the transparent substrate, continuing from the fourth anti-reflective layer, and inwardly of the top layer, if any:

optionally, a fourth seed layer, a fourth functional metal layer, optionally, at least one fourth blocker layer, and a fifth anti-reflective layer, wherein the fifth anti-reflective layer has at least one dielectric layer.

14. The glazing as claimed in claim 13, wherein the fourth functional metal layer comprises a fourth Ag alloy consisting essentially of Ag and Al.

15. The glazing as claimed in claim 14, wherein an Al content of the fourth Ag alloy is 0.05-0.20 at %, the rest being Ag.

16. The glazing as claimed in claim 13, wherein the fourth functional metal layer consists essentially of Ag.

17. The glazing as claimed in claim 13, wherein the thickness of at least one of the first functional metal layer, the second functional metal layer, the third functional metal layer and the fourth functional metal layer is 5-20 nm.

18. The glazing as claimed in claim 1, wherein the glazing has a light transmittance of at least 20%, as determined according to the European standard EN 410.

\* \* \* \* \*